US006501501B1

United States Patent
Miyazawa

(10) Patent No.: US 6,501,501 B1
(45) Date of Patent: Dec. 31, 2002

(54) CONSTRUCTION AND CIVIL ENGINEERING DATABASE GENERATOR AND DISPLAY

(75) Inventor: Takeo Miyazawa, Mitaka (JP)

(73) Assignee: Aizudoken Co. Ltd., Fukushima-ken (JP)

( * ) Notice: Subject to any disclaimer, the term of this patent is extended or adjusted under 35 U.S.C. 154(b) by 0 days.

(21) Appl. No.: 09/559,328

(22) Filed: Apr. 27, 2000

(30) Foreign Application Priority Data

Apr. 28, 1999 (JP) .......................................... 11-122249
May 24, 1999 (JP) .......................................... 11-143082

(51) Int. Cl.⁷ ............................. H04N 7/18; G06F 17/00
(52) U.S. Cl. ....................... 348/143; 707/104.1; 707/5; 348/143; 340/870.7; 701/208
(58) Field of Search .............................. 707/102, 104.1, 707/5; 701/208; 702/3; 703/6; 704/1; 706/14; 713/200; 717/105; 345/419, 441, 630, 853; 340/870.07, 901, 990, 995; 382/103, 104, 113; 348/82–84, 113, 135, 142–148; 386/95

(56) References Cited

U.S. PATENT DOCUMENTS

| | | | | |
|---|---|---|---|---|
| 4,904,996 A | * | 2/1990 | Fernandes | 340/310.07 |
| 5,015,187 A | * | 5/1991 | Lord | 244/17.13 |
| 5,029,101 A | * | 7/1991 | Fernandes | 340/601 |
| 5,412,569 A | * | 5/1995 | Corby et al. | 340/853.2 |
| 5,414,462 A | * | 5/1995 | Veatch | 348/135 |
| 5,596,494 A | * | 1/1997 | Kuo | 348/144 |
| 5,731,997 A | * | 3/1998 | Manson et al. | 345/835 |
| 5,745,387 A | * | 4/1998 | Corby et al. | 348/114 |
| 5,745,751 A | * | 4/1998 | Nelson et al. | 707/104.1 |
| 5,870,741 A | * | 2/1999 | Kawabe et al. | 707/5 |
| 5,999,878 A | * | 12/1999 | Hanson et al. | 701/208 |
| 6,175,380 B1 | * | 1/2001 | Van Den Bosch | 348/84 |
| 6,257,774 B1 | * | 7/2001 | Stack | 717/110 |

OTHER PUBLICATIONS

Slater, David et al., "Material Classification for 3D Objects in Aerial Hyperspectral Images", IEEE Computer Society Conference on Computer Vision and Pattern Recognition, vol. 2, Jun. 23–25, 1999, pp. 268–273.*

* cited by examiner

Primary Examiner—Howard Britton
Assistant Examiner—Shahid Alam
(74) Attorney, Agent, or Firm—Oliff & Berridge, PLC

(57) ABSTRACT

A device generates a database suited for maintenance of construction and civil engineering works, particularly very long and narrow bridges, roads, and slope faces. A device also displays the database. The database generator comprises a video camera which moves in the direction of the length of said object to successively capture images of an object, a position measuring unit which outputs data relating to the capturing position, a video recorder which records the output from said image input unit in synchronism with the positional information output from said position measuring unit, an image synthesis unit which, when the information recorded by said video recorder is reproduced, refers to said positional information and synthesizes the reproduced plurality of images into one image, and a memory for storing the synthesized image. The generated image database is posted on an Internet server and displayed via a browser.

15 Claims, 15 Drawing Sheets

FIG. 5
(a)
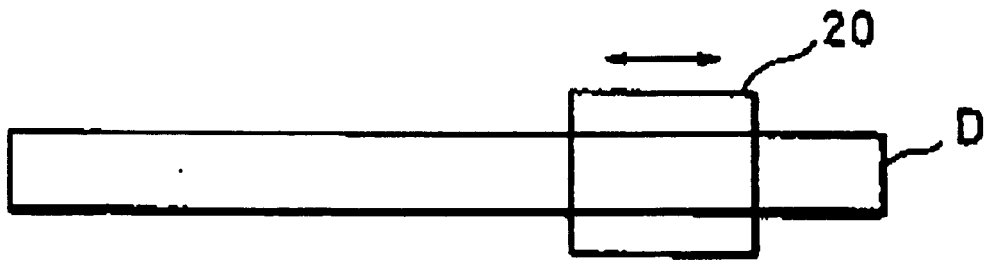
(b)
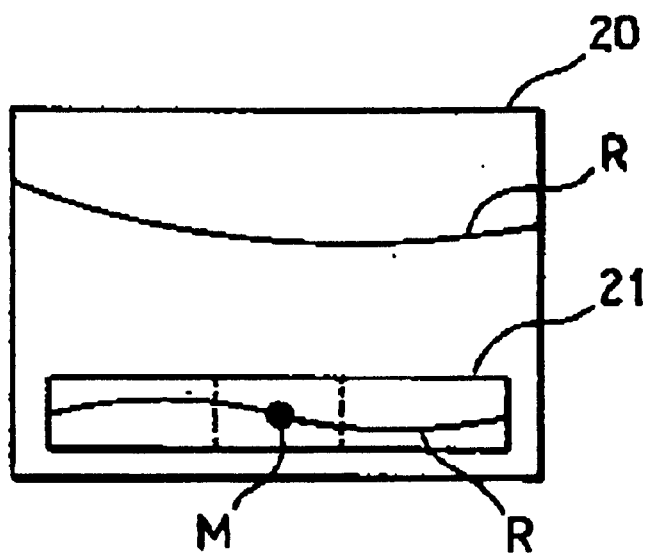
(c)
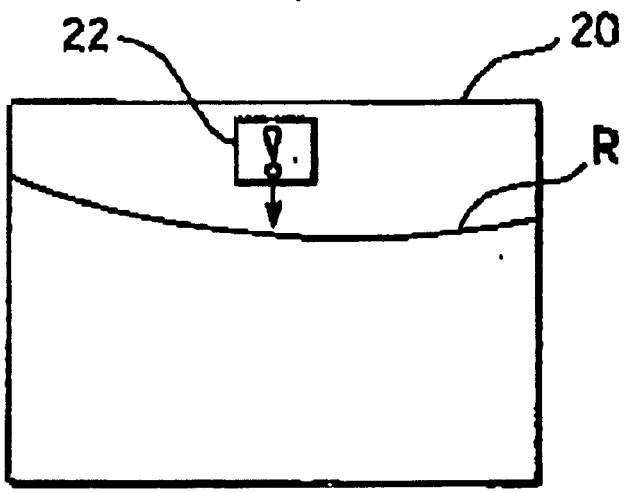

FIG. 7
(a)
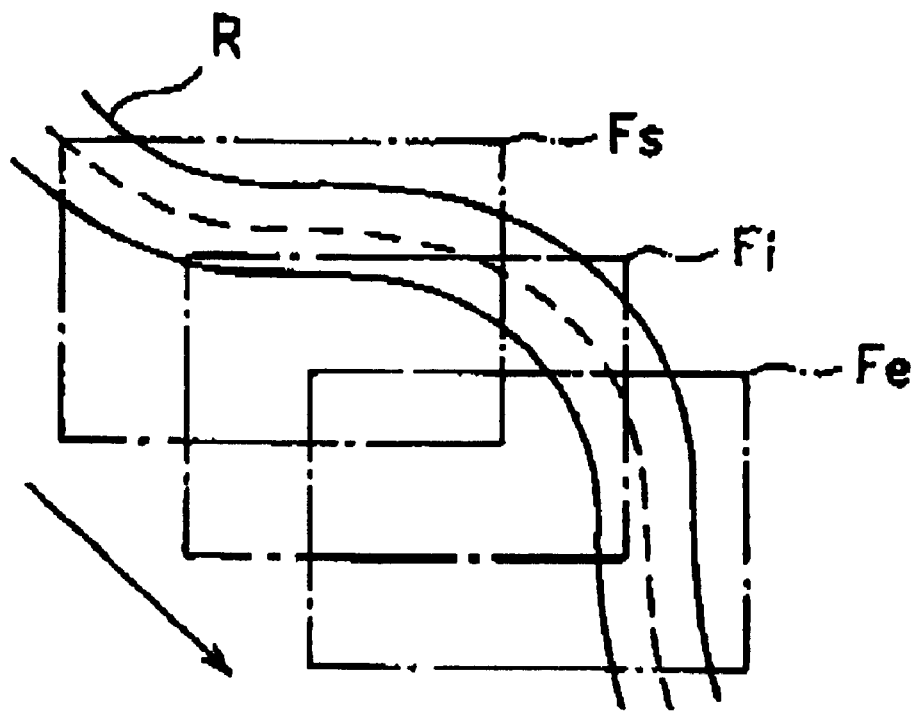
(b)
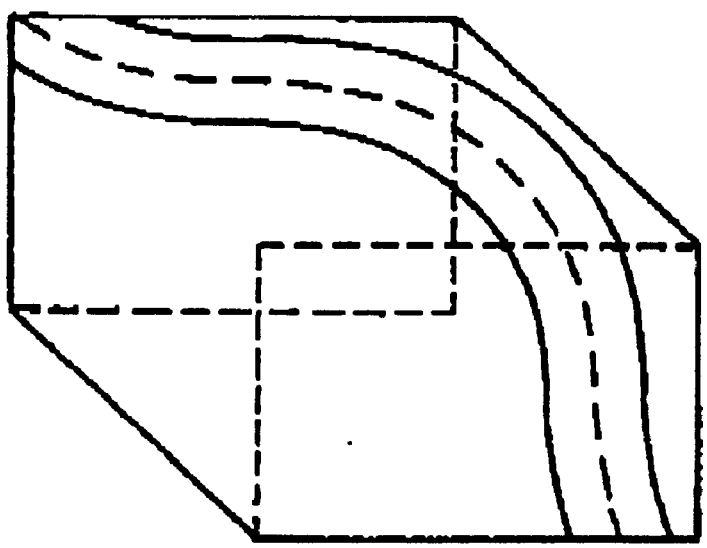

FIG. 9
(a)
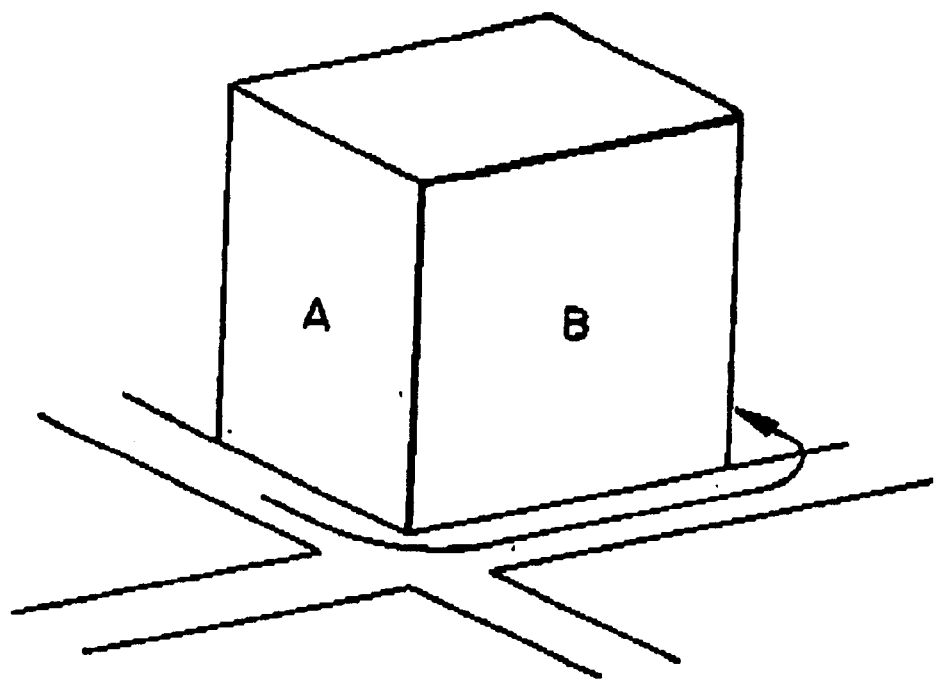
(b)
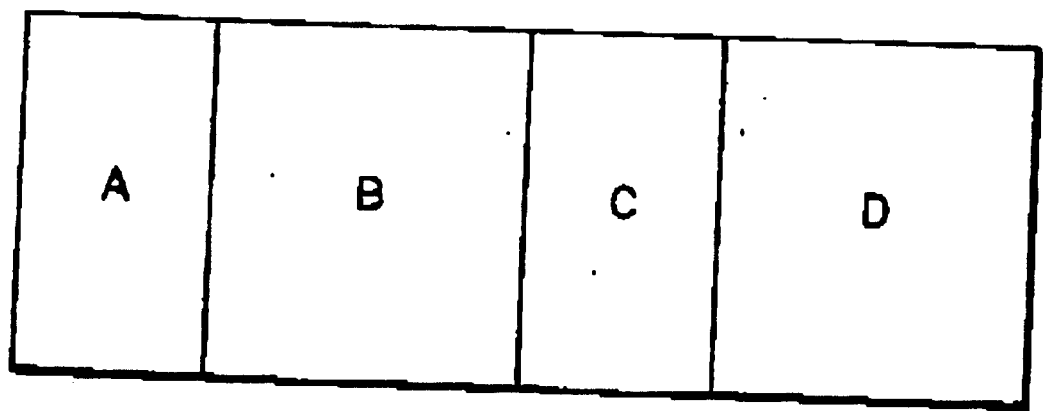

FIG. 13
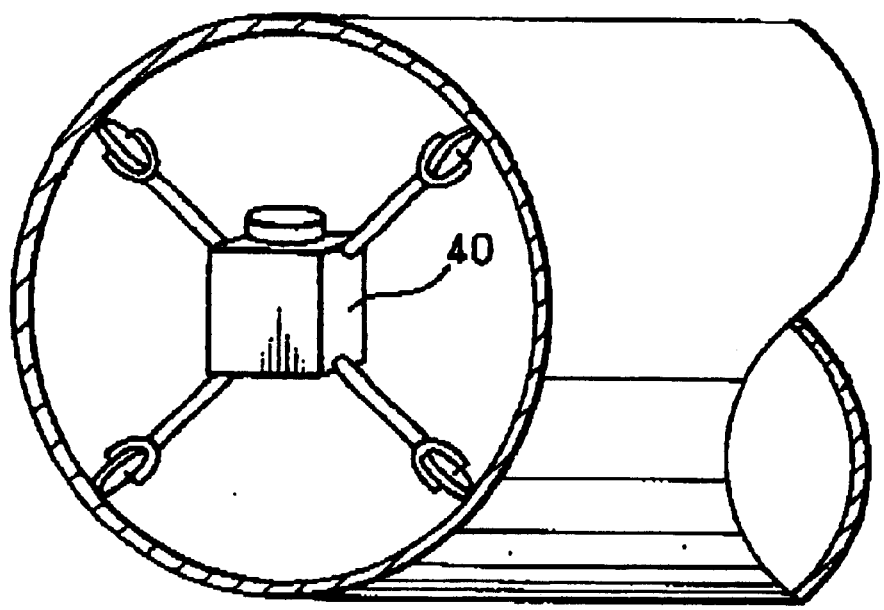
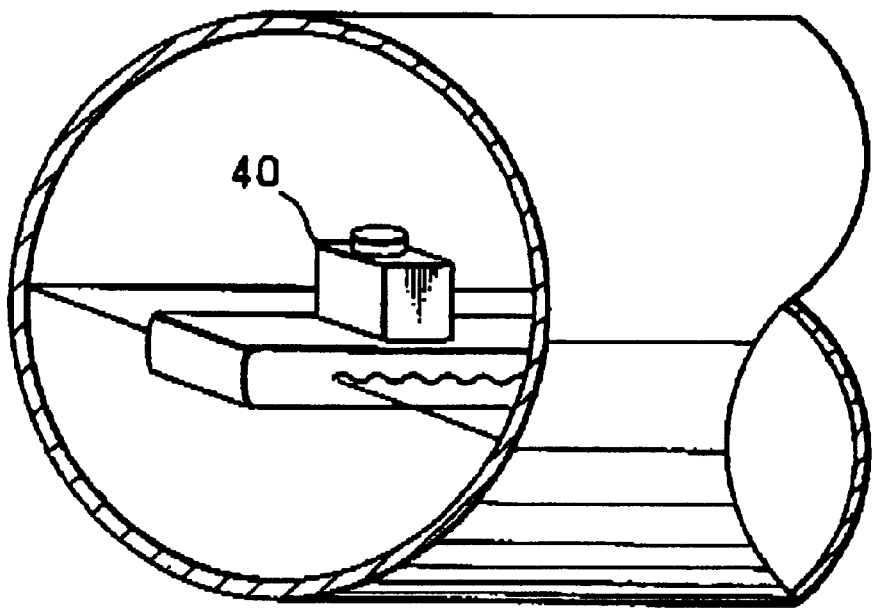

FIG. 14
(a)
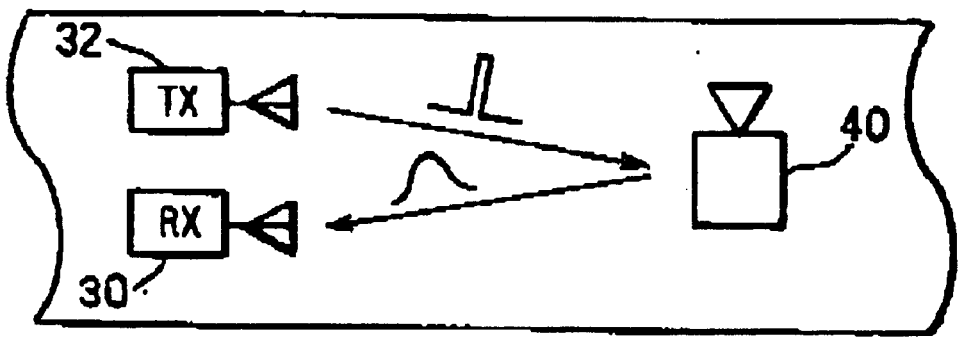
(b)
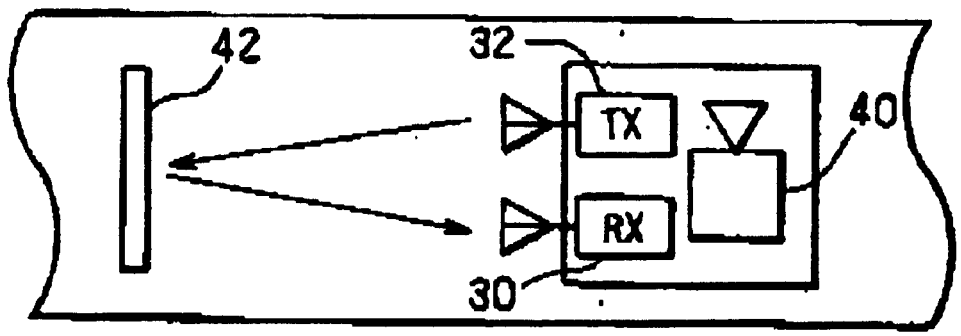
(c)
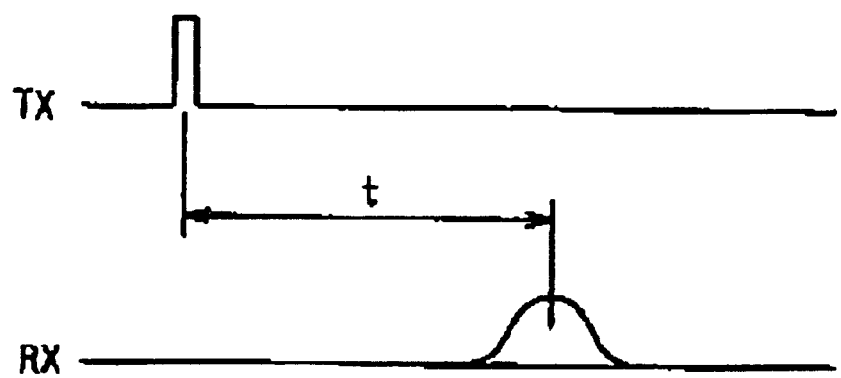

FIG. 15
(a)
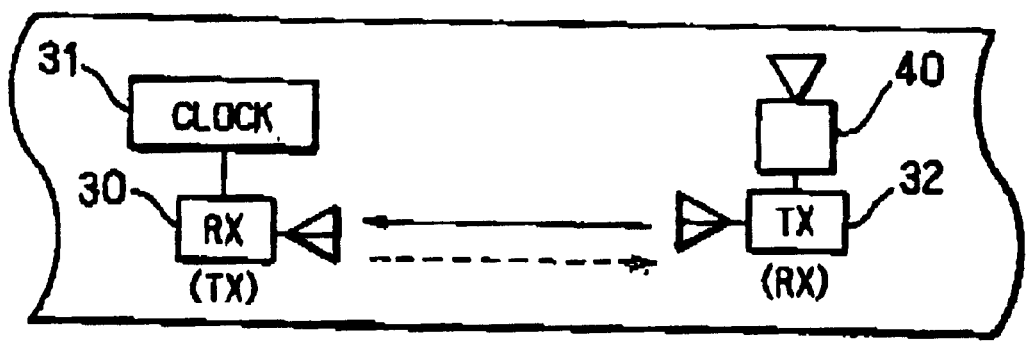
(b)
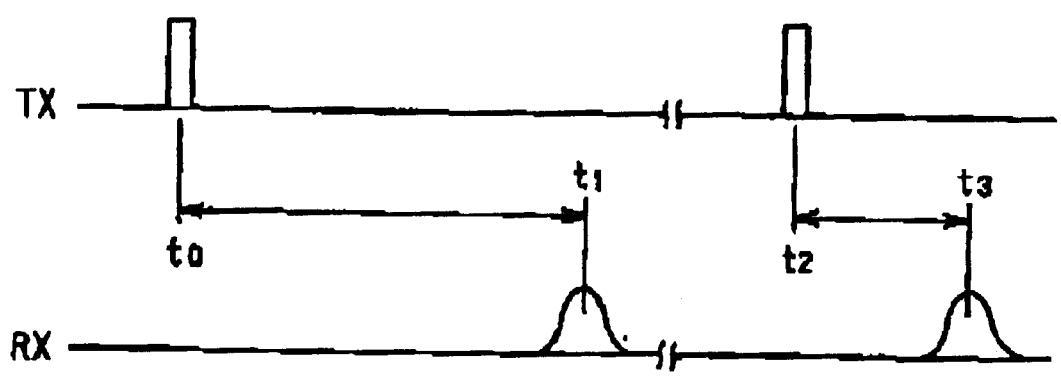

CONSTRUCTION AND CIVIL ENGINEERING DATABASE GENERATOR AND DISPLAY

BACKGROUND OF THE INVENTION

1. Field of the Invention

The present invention relates generally to a device for generating a database used for maintaining construction and civil engineering works, and a device for displaying the database, and particularly to a generator and display for a construction and civil engineering database containing the data of long and narrow construction and civil engineering objects such as bridges, roads, and slope faces, which normally cannot be wholly photographed in one shot, and various information linked to such data.

2. Description of the Related Art

Conventionally, maintenance of buildings, roads and bridges, etc., was performed by maintenance staff patrolling them to visually or otherwise detect any anomalies. This method was slow and expensive as it relied on human hand, and required experienced staff for adequate maintenance. If any anomaly was detected, an expert had to directly go to the site, which made it difficult to take rapid measures.

Therefore, there was a demand for a system to easily and automatically perform the maintenance of construction and civil engineering works.

SUMMARY OF THE INVENTION

To meet such demand, the present invention provides a database generator and display particularly suited to use in the maintenance of construction and civil engineering works.

It is an objective of the present invention to provide a database generator and display that facilitates the maintenance of construction and civil engineering works, allows maintenance of bridges, roads, slopes and similar structures as one static image (this permits a considerably rapid search compared to when using a video image) allows connection to the Internet, allows maintenance of civil engineering works via a network, and allows automatic analysis and issuance of warnings for age-based deterioration via a computer.

In order to achieve the objective above, the construction and civil engineering database generator which synthesizes a plurality of successive images of a long and narrow construction or civil engineering object to generate the data for said object in its whole size, comprises an image input unit which moves in the direction of the length of said object to succesively capture images of said object; a position measuring unit which outputs data relating to the capturing position; a video recorder which records the output from said image input unit in synchronism with the positional information output from said position measuring unit; an image synthesis unit which, when the information recorded by said video recorder is reproduced, refers to said positional information and synthesizes the reproduced plurality of images into one image; and a memory for storing the synthesized image.

The object to be captured according to the present invention may be very long and narrow such as bridges, roads and slopes, but may also be one with sides that are not so long and narrow, such as a building, or a development of the building, as described in the embodiments below.

BRIEF DESCRIPTION OF THE DRAWINGS

FIG. 5 is a view explaining the movements of the image display unit according to embodiment 1 of the present invention;

FIG. 7 is a view explaining the movements of the image synthesis unit according to embodiment 1 of the present invention;

FIG. 9 is a view explaining another use of embodiment 1 of the present invention;

FIG. 13 is a view explaining the image input unit according to embodiment 2 of the present invention in use;

FIG. 14 is a view explaining the method of specifying the position of the image input unit according to embodiment 2 of the present invention;

FIG. 15 is a view explaining another method of specifying the position of the image input unit according to embodiment 2 of the present invention;

DESCRIPTION OF THE PREFERRED EMBODIMENTS

Embodiment 1

Now, an embodiment of the present invention will be described using the drawings.

The device and method relating to the present embodiment includes image input and synthesis functions, a database building function and an application.

Image input and synthesis functions are realized for example by transmitting video images captured by a digital video recorder to a computer and preparing the data of a single, long and narrow continuous image. This is automatically processed without requiring correction of the image nor adjustment of the recording format, etc.

The database building function is to manage a database containing the obtained and processed data on an Internet server. It is possible to set up links between the data and two-dimensional map data, and to manage subsequently added data in integration with existing data.

The applications are devices and software for accessing data in a server via a browser, indicating, searching or updating such data by combining various search conditions, and pasting text data and data links to other programs for example as hyper-text onto such data, etc.

Figure 1:
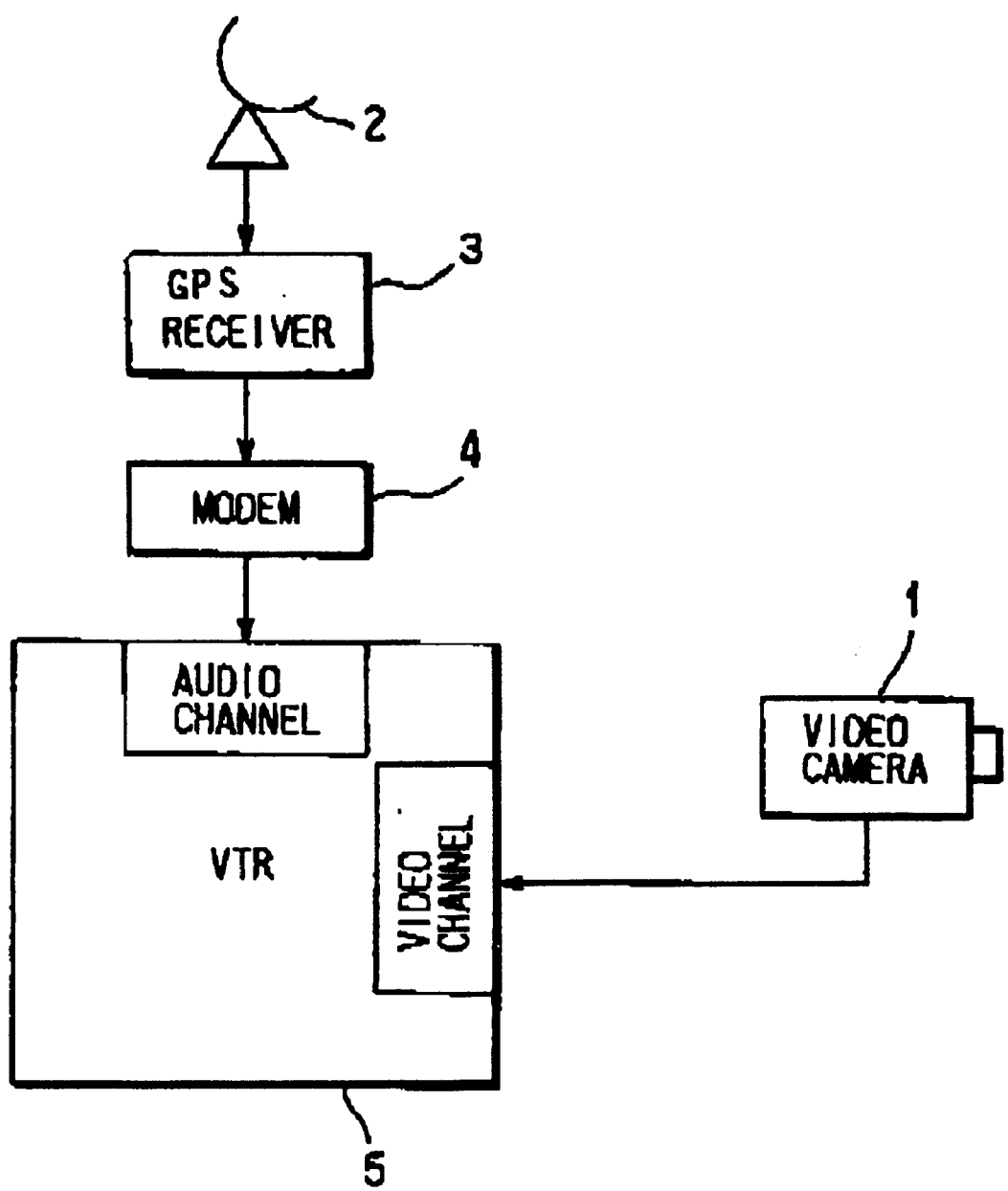
FIG. 1 is a schematic block diagram of the image capture unit according to embodiment 1 of the present invention.

FIG. 1 shows the schematic structure of an image input unit according to the present embodiment. Video camera 1 through video recorder (VTR) 5 are mounted on cars that are not illustrated. Video camera 1 is provided for example on the side of the car in order to capture the object to be captured, such as a bridge, road or slope face in its entire size while the car is running. When, for example, capturing a road from aerial survey, the device in FIG. 1 is mounted on an airplane and video camera 1 is placed with its lens downward.

The output from video camera 1 is input in the video channel terminal of VTR 5. The data from global positioning system (GPS) receiver 3 is input in the audio channel. GPS receiver 3 outputs three-dimensional positional data (e.g., latitude, longitude and altitude) as digital data. For purposes of recording this data in VTR 5, this data is parallel-to-serial converted, and then modulated by modem 4. As the updating speed of GPS data is slow, recording via the audio channel of VTR 5 is sufficient. By using the video and audio channels in this way, it is possible to record image and positional data in synchronism on the same video tape. The audio channel may be used to record information on the running speed and running direction of the car alone, or together with the positional data.

When using a digital video recorder, a frame memory may be used together with, or in substitute of, modem 4 to record the digital positional information output in the video recorder.

Figure 4:
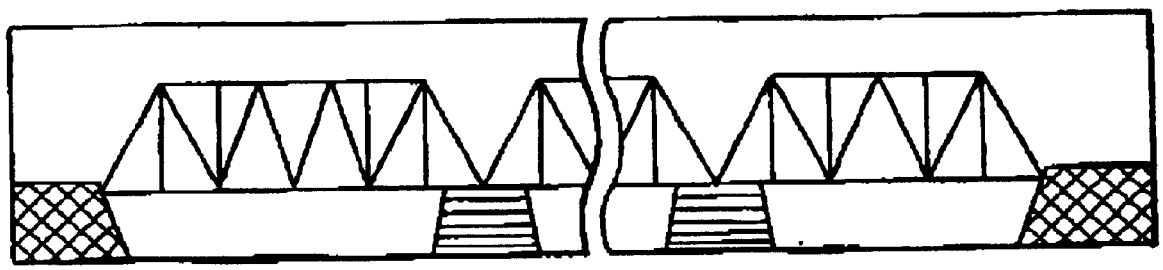
FIG. 4 is an example of an image obtained from the image capture unit and image synthesis unit according to embodiment 1 of the present invention.

In order to collect the image data, the video tape is set in the recorder, the video camera is directed in the desired direction, and the car with the equipment mounted thereon is driven along the object to be captured. For example, if the object is a railroad bridge as in FIG. 4, the car is driven along this bridge. Preferably, the car should be driven in closer distance along the object than as shown in FIG. 4 in order to show the object in detail.

Figure 2:
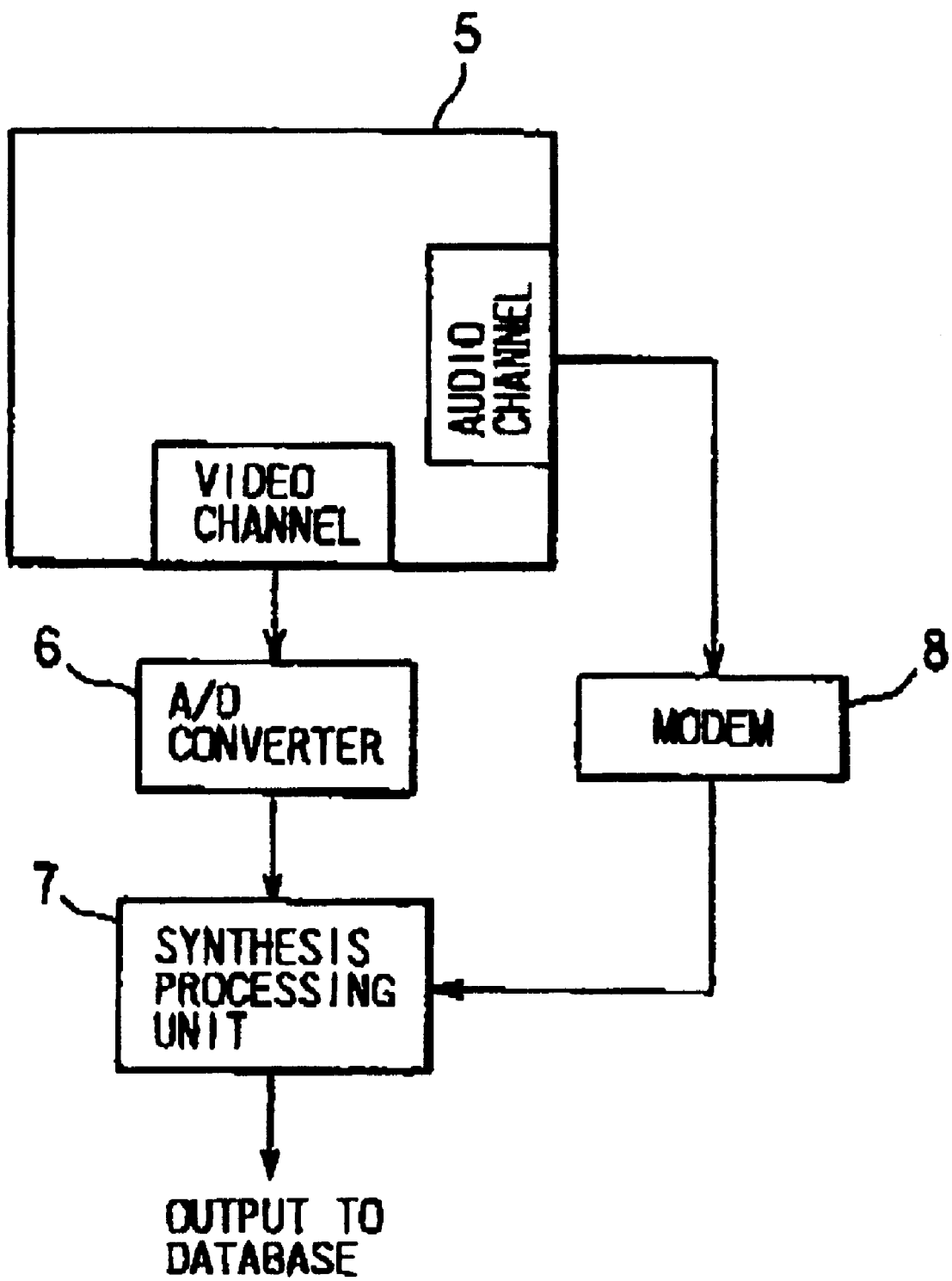
FIG. 2 is a schematic block diagram of the image synthesis unit according to embodiment 1 of the present invention.

The collected image data is synthesized into one long, narrow image by the devices in FIG. 2. FIG. 2 shows the schematic structure of the image synthesis unit according to the present embodiment. The video channel output of VTR 5 is input into A/D converter 6 for conversion into digital data. The output from the audio channel is demodulated by modem 8. Synthesis processing unit 7 synthesizes the image by receiving the positional information from modem 8 and judging the absolute position of the image data and the relative positions of a plurality of image data. Therefore, even if video camera 1 discontinues its capturing process, or the car changes its speed, a correct synthesis of the images is ensured. This synthesizing process provides a very long and narrow image as in FIG. 4.

The synthesizing process will be described briefly using FIG. 7. FIG. 7 illustrates how a road on the ground is seen from an airplane. Frames Fs, . . . Fe in FIG. 7(a) each show the captured range of video camera 1. Assuming frames Fs to Fe are successively shot to capture road R. These shots are made to cover road R. Intermediate frames Fi exist numerously between frames Fs and Fe. These frames overlap with each other. By superposing neighboring frames so that the overlapping portions match, a single image can be obtained that covers a range exceeding the individual captured ranges. This process is done for all frames Fs to Fe to obtain a singular image as in FIG. 7(b). Algorisms for performing this series of processes automatically by a computer are known for example in the research by S. Peleg and J. Herman, "Panoramic mosaics by manifold projection" in IEEE Conf. Computer Vision and Pattern Recognition, pages 338–343, June 1997, and R. Szeliski, "Video mosaics for virtual environments" in IEEE Computer Graphics and Applications, 16:22–30, March 1996.

Figure 6:
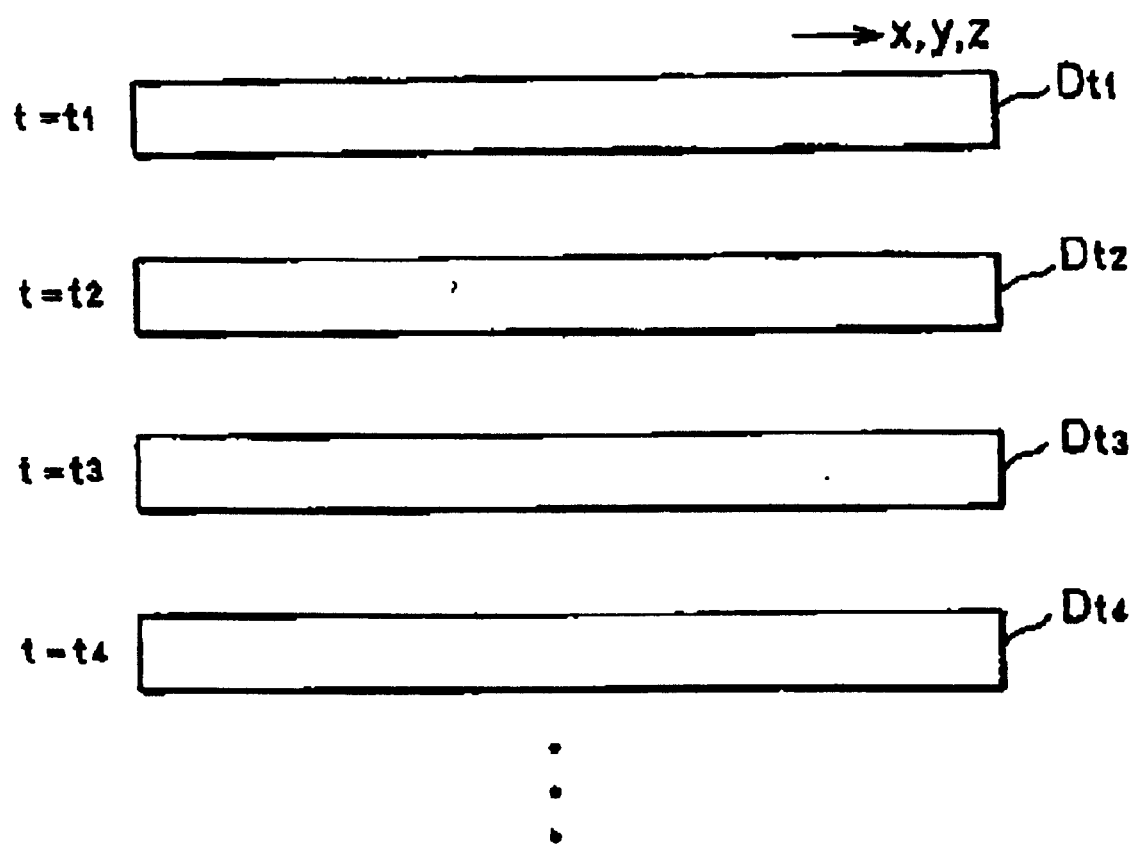
FIG. 6 is an illustrative view of the image database according to embodiment 1 of the present invention.

The very long and narrow image data obtained above is recorded for example on a hard disc or DVD. For maintenance purposes in the field of construction and civil engineering, it is desirable to store a plurality of image data recorded for the same object at different hours of the day and times of the year. For example, in FIG. 6, data $Dt_1$, $Dt_2$, $Dt_3$, $Dt_4$, . . . are recorded at hours $t_1$, $t_2$, $t_3$, $t_4$, . . . These image data are arranged so that their three-dimensional positions x, y, z correspond to each other. Accordingly, by designating a specific three-dimensional position $x_0$, $y_0$, $z_0$, it is possible to easily extract the data for the same portion of the captured object at different hours $t_1$, $t_2$, $t_3$, $t_4$, . . . In this way, the image data for a specific portion of the captured object can be extracted by designating a three-dimensional position, and information linked to such portion can also be extracted as described below.

Figure 3:
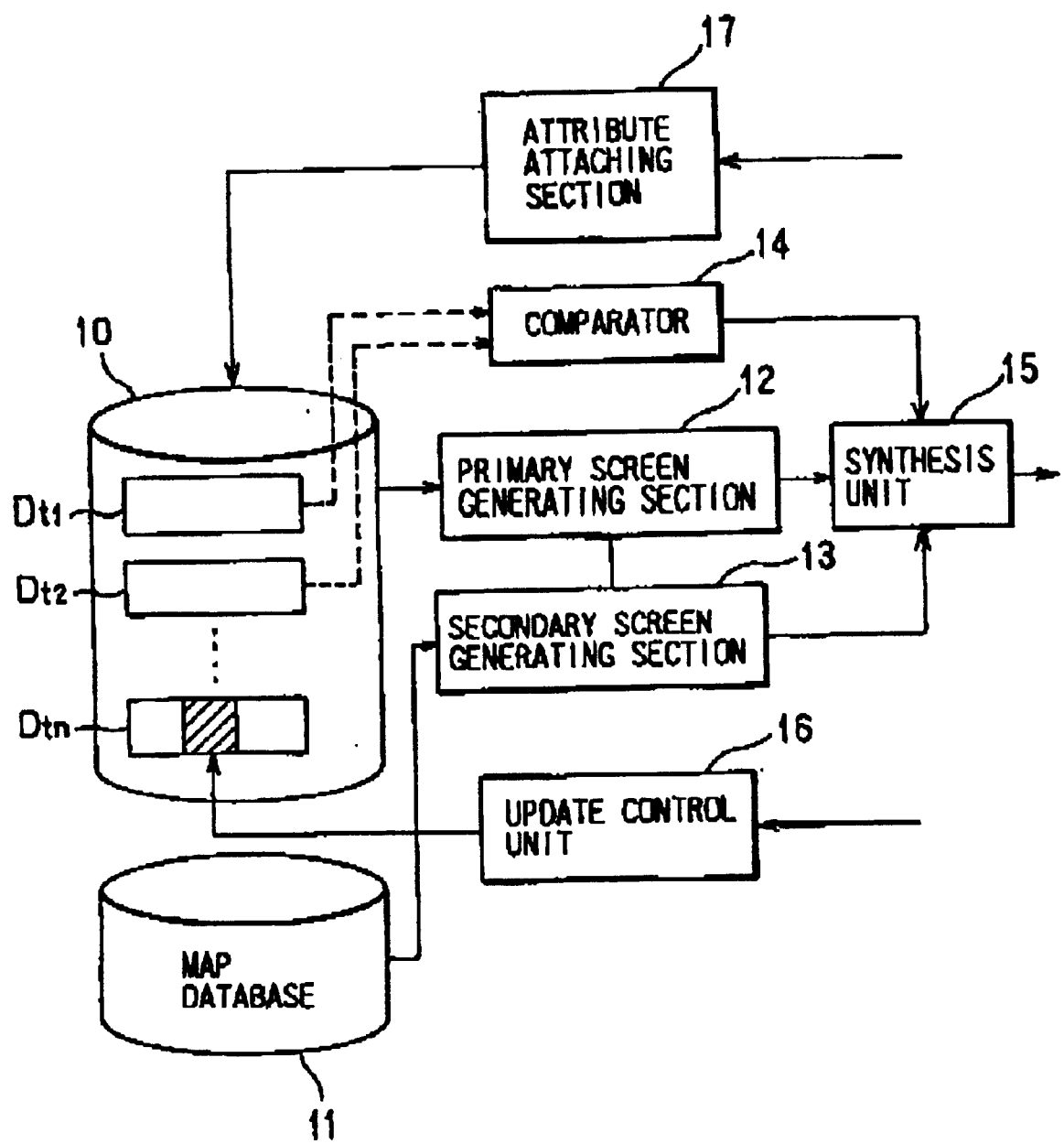
FIG. 3 is a schematic block diagram of the image database and the image display unit according to embodiment 1 of the present invention.

As shown in FIG. 3, the device according to the present embodiment includes memory means 10 for storing the database comprising the above-mentioned plurality of image data, and map database 11 for storing map data related to such image data. This map data may be digital map information on the market. By interconnecting these two databases at three-dimensional positions, it is possible to easily extract corresponding information from the other database by designating a specific three-dimensional position at one database. The data of image database 10 is mainly read by main screen generating section 12. The data of map database 11 is mainly read by secondary screen generating section 13. These outputs are synthesized by synthesis unit 15, and displayed on display units such as CRT displays, liquid crystal displays or projectors.

As shown in FIG. 5, main screen generating section 12 generates main screen 20 in a range displayable on the screen of the display unit, displaying a portion of the very long and narrow image data D. As shown in FIG. 5(a), the portion of image data D to be displayed can be selected by the user. Therefore, by moving the main screen, it is possible to view the whole object such as a railroad bridge, road or slope face.

The secondary screen shows which portion of the object is being displayed by the main screen. As shown in FIG. 5(b), secondary screen 21 displays a marker M indicating the portion displayed on the main screen on the map of road R obtained from map database 11. This process is easily performed as the three-dimensional positions of the image data and the map data correspond to each other as described above.

The user can perform maintenance of the construction and civil engineering works by moving the main screen. If the user detects an anomaly at one portion, the user may desire to display comments such as "observation required" or "needs repair," and information on the degree of urgency on this portion, or pass on the displayed information to third parties. In such case, attribute attaching section 17 inserts comments or links (e.g., in html) in an arbitrary position within image data D according to the user's request. The attribute data is displayed for example as depicted by reference numeral 22 in FIG. 5(c). Maintenance is also facilitated as it is possible to search the attribute data to display the anomalies.

Figure 8:
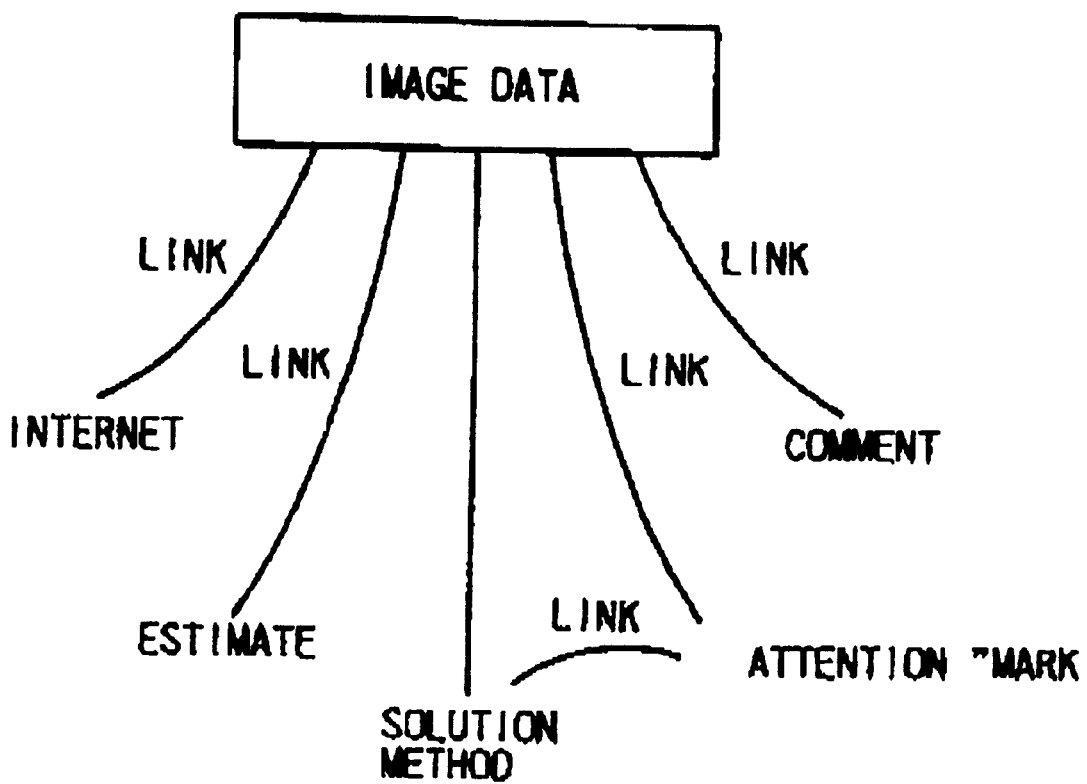
FIG. 8 is a view explaining the links of the image database according to embodiment 1 of the present invention.

FIG. 8 shows examples of attribute information. These may be comments, attention marks, methods of dealing with problems, estimates of repair costs, and relevant internet addresses. Various links with these image data gives users the merit of easily obtaining necessary information only by clicking on the portion providing desired information on a portion of the image data. This way of obtaining necessary information mainly from images is a characteristic that is very important from the aspect of maintenance of construction and civil engineering works. The reason is that in this field, maintenance took place mainly through visual inspection. It was therefore desirable from the user-friendly aspect that computerization of the maintenance process allows access based on visual information. Conventional databases mainly using text were not well-suited to this purpose.

Comparator 14 in FIG. 3 compares image data collected at different hours and shows the changes between them. The output from comparator 14 is synthesized and shown together with the output from main screen generating section 12 and secondary screen generating section 13. Comparator 14 indicates the changes for example in bold.

Update control unit 16 in FIG. 3 updates portions of existing image data. When necessities arise to update portions of images, then new image data are fed to update control unit 16 to perform the updating.

It is also possible to build databases 10 and 11 in FIG. 3 on servers connected via the Internet or intranet. In such case, main screen generating section 12, etc., are realized through a computer that can access the Internet and a browser software. If the databases are built on the Internet, the following merits can be gained. One is that many people who are involved can easily access the databases. For example, if an anomaly is detected at a portion of a structure which requires inspection by an expert, this inspection is very easy to implement. Another is that the display function can be taken over by a common browser. This also allows easy implementation of the display function.

Figure 10:
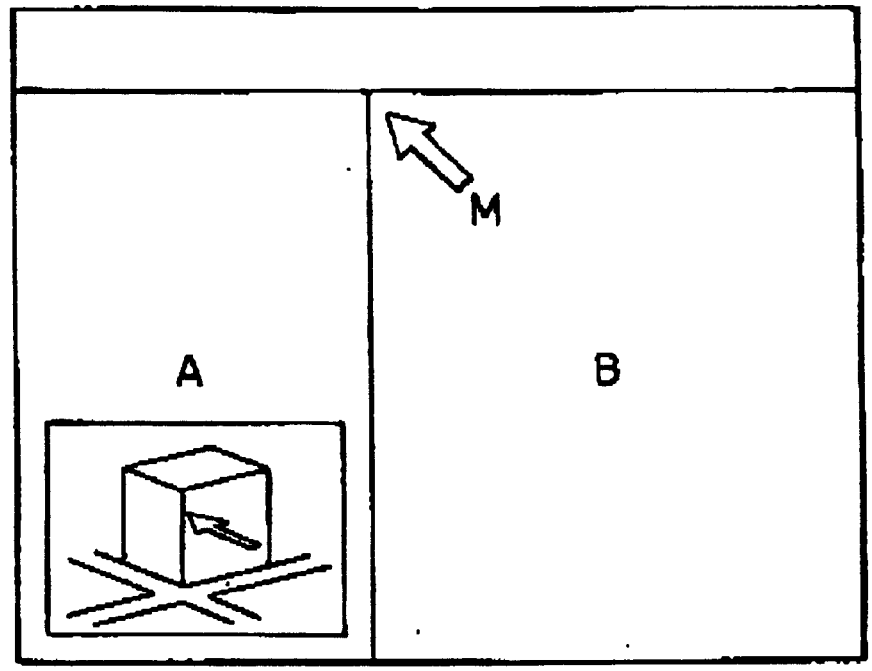
FIG. 10 is a view explaining another use of embodiment 1 of the present invention.

The description above related to an example using civil engineering works such as bridges and roads, but it can also be applied to general buildings. A car with the devices according to the present embodiment mounted thereon is driven around a building as shown in FIG. 9(a). Thereby, one image showing each side A, B, C and D of the building can be obtained as shown in FIG. 9(b). This image is quasi a development of the building. This image can be treated in the same way as with the image of bridges or roads described above. For, example, as shown in FIG. 10, it is possible to show the main screen and the secondary screen at the same time together with a marker M.

This type of two-dimensional database is very simple in structure compared to types that directly express three-dimensional structures, and is also very easy to use. According to the present embodiment, conversion of three-dimensional data to two-dimensional data is performed only by moving a vehicle with devices mounted thereon, which is very convenient.

The above descriptions are only examples of the present invention, and it is also possible to realize the present invention with other structures and to use it to other purposes of use. For example, it is possible to add the function of automatically recognizing a three-dimensional form to build a database in three-dimensional form, or use a plurality of video cameras to record a large object with high image quality, or add the function of extracting images of the desired object by distinguishing the object from its background based on their different movements, or installing a plurality of video cameras at the same time at different locations to issue warnings of changes in the shape of bridges, etc., in real time.

Embodiment 2

Now, another embodiment of the present invention will be described by using FIGS. 11 to 16.

This embodiment is a device for making an image database by capturing the inside of pipelines, aqueducts or tunnels etc. Conventionally, when constructing or maintaining pipelines, their outer and inner surfaces were visually inspected. Pipelines are very long, and maintenance requires much time. However, currently, this work relies only on human hand. It is expected that by applying the image database according to the present invention, the time and labor involved in maintenance will be largely reduced.

Figure 11:
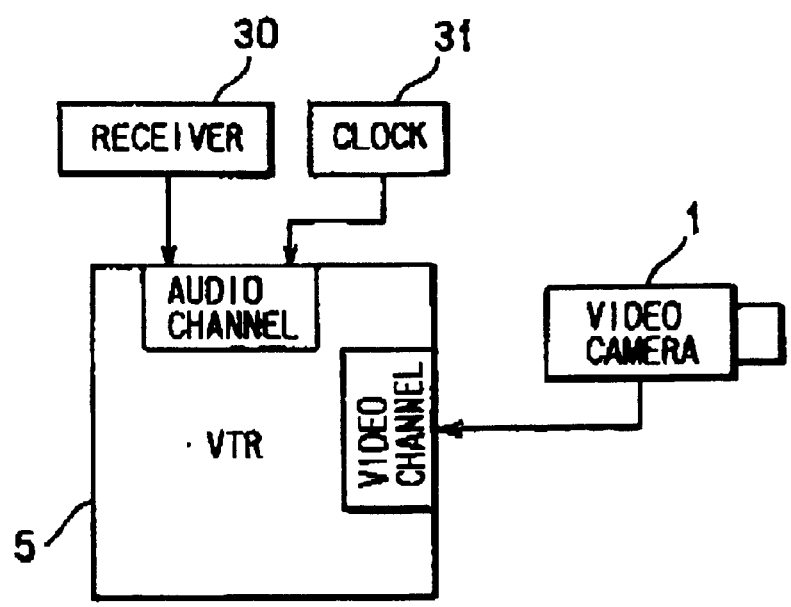
FIG. 11 is a schematic block diagram of the image input unit according to embodiment 2 of the present invention.

FIG. 11 shows an image input unit according to a second embodiment of the present invention for capturing the inside of pipelines, etc. The images captured by video camera 1 are recorded in the video channel of VTR 5, and in the audio channel, output signals of receiver 30 and clock signals from clock 31 are recorded as positional signals.

Figure 12:
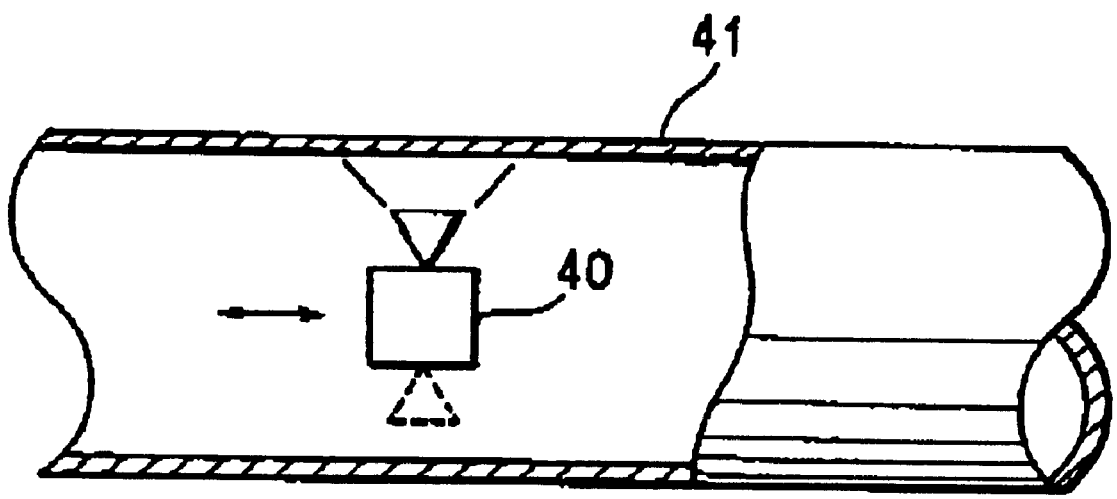
FIG. 12 is a view explaining the image input unit according to embodiment 2 of the present invention in use.

FIG. 12 explains how the device according to FIG. 11 is used. Image input unit 40 shown in FIG. 11 is arranged inside pipeline 41, and is allowed to move freely in the interior of pipeline 41. Images captured by image input unit 40 during its movement are processed to form a very long and narrow image database as described for embodiment 1 of the present invention. This database greatly facilitates the maintenance work. In order to allow video camera 1 to capture all portions of the interior, it desirably has a wide-angle lens. If necessary, two video cameras linked together at their back sides may be used.

In order for image input unit 40 to freely move inside pipeline 41, it may have arms with a plurality of wheels contacting the inner face of pipeline 41 to support it as shown in FIG. 13(a), or it may be mounted on top of a float that floats on the liquid flowing within pipeline 41, as shown in FIG. 13(b).

A problem with embodiment 2 is how to judge the current position of image input unit 40. For embodiment 1, a GPS could be used as the device was mounted outdoors, but in embodiment 2, pipeline 41 shuts out the radio waves from the GPS, so a GPS cannot be used.

Therefore it is possible to use the following method.

FIG. 14 shows how a sonar is used to calculate the distance between the sonar and image input unit 40 based on the lapsed time from the point an ultrasonic wave is sent out until it is reflected back. In FIG. 14(a), ultrasonic transmitter (TX)30 and ultrasonic receiver (RX)32 are arranged at predetermined positions in pipeline 41 to calculate the distance therefrom to image input unit 40 within pipeline 41. FIG. 14(b) illustrates how ultrasonic transmitter 30 and ultrasonic receiver 32 are mounted on the same platform as image input unit 40 to calculate the distance therefrom to reflector plate 42 within pipeline 41. According to this structure, it is possible to provide VTR 5 on the platform to input the output signals from receiver 30 directly into VTR 5. FIG. 14(c) shows how the distance is calculated. If the transmission and reception is performed via direct waves, and time t was required from the transmission to the reception of the reflected wave, the distance between transmitter/receiver 30, 32 and image input unit 40 (FIG. 14(a)) and the distance between image input unit 40 and reflector plate 42 (FIG. 14(b)) is calculated as follows:

$$(\text{Transmitting velocity})=t/2.$$

In FIG. 15(a), a receiver (or transmitter) is fixed to pipeline 41. This receiver (or transmitter) receives ultrasonic pulses transmitted in constant intervals by a transmitter (or receiver) that moves together with image input unit 40. The distance is then calculated by measuring the time of reception. By providing clock devices on receiver 30 and transmitter 32, respectively, and fixing the times of transmission in advance, the time of reception is easily obtained. For example, as shown in FIG. 15(b), the receiving side can obtain the reception time t1 together with transmission time t0 via the regular transmission intervals. The distance is calculated as:

(Transmitting velocity)=(t1−t0).

It is desirable to provide a receiver on the side of image input unit 40, in the same way as FIG. 14(b).

Figure 16:
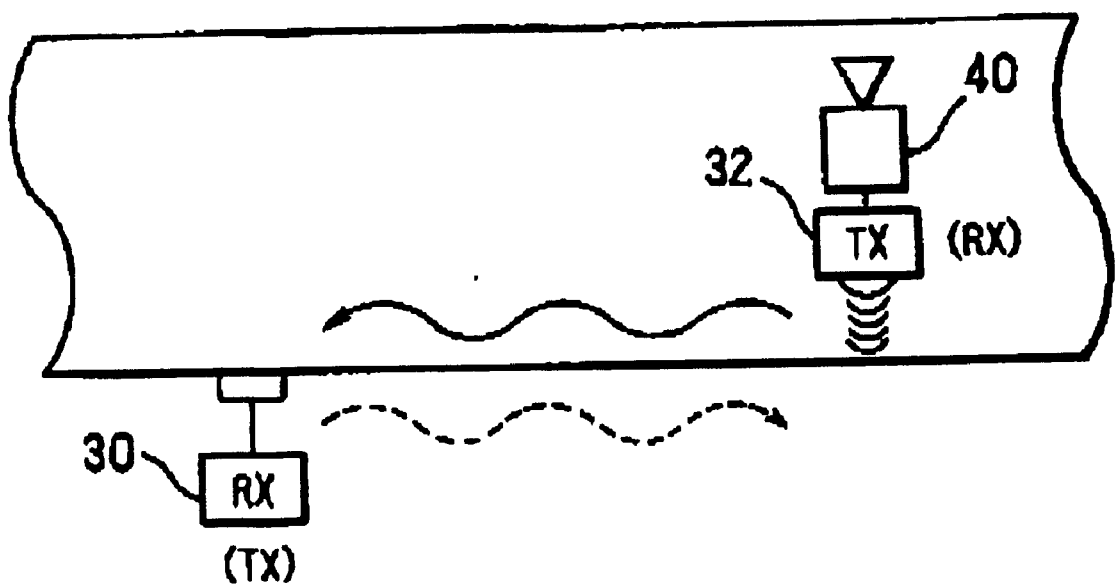
FIG. 16 is a view explaining another method of specifying the position of the image input unit according to embodiment 2 of the present invention.

The example in FIG. 15 used direct waves, but it is also possible to use waves that propagate through the pipeline itself as shown in FIG. 16. Transmitter 32 fires ultrasonic pulses toward the wall of the pipeline, which then propagate through the face of the pipe. They are then detected by receiver 30.

Although embodiments 1 and 2 of the present invention used cameras as image input unit 40, this is not restrictive. For example, it is also possible to use ultrasonic flaw detectors that detect inner flaws by using ultrasonic waves, or underground survey radars that detect the positions of underground pipes by using radio waves, as the image input unit of the present invention. More generally, a sensor that can obtain two-dimensional information and that can scan objects that are wider than its field of view can be used as the image input unit of the present invention.

Furthermore, means as used in this specification are not limited to physical means, and includes cases where the functions of means are realized through software. Also, the functions of one means may be realized by two or more physical means, and the functions of two or more means may be realized by one physical means.

What is claimed is:

1. A construction and civil engineering database generator which synthesizes a plurality of successive images of a long and narrow construction or civil engineering object to generate the data for said object in its whole size, comprising:

an image input unit which moves in the direction of the length of said object to successively capture images of said object;

a position measuring unit which outputs data relating to the capturing position;

a video recorder which records the output from said image input unit in synchronism with the positional information output from said position measuring unit;

an image synthesis unit which, when the information recorded by said video recorder is reproduced, referred to said positional information and synthesizes the reproduced plurality of images into one image; and a memory for storing the synthesized image.

2. A construction and civil engineering database generator according to claim 1, the generator being mounted on a vehicle, wherein said image input unit is arranged to successively capture images of said object following the movement of said vehicle, said position measuring unit comprises at least one of a car navigation device and an independent GPS device, and the database generator further comprises a modem to modulate the digital positional information output to record the information in the audio channel of said video recorder.

3. A construction and civil engineering database generator according to claim 1, the generator being mounted on a vehicle, wherein said image input unit is arranged to successively capture images of said object following the movement of said vehicle, said position measuring unit comprises at least one of a car navigation device and an independent GPS device, and the database generator further comprises a frame memory to store the digital positional information output as digital data.

4. A construction and civil engineering database generator according to claim 1, the generator being mounted on a platform that is freely movable within the interior of a cylindrical structure including pipelines, aqueducts and tunnels, wherein said image input unit is arranged to successively capture images of the interior of said cylindrical structure following the movement of the image input unit, said position measuring unit uses acoustic waves or ultrasonic waves, and the database generator further comprises a modem to modulate the digital positional information output to record the information in the audio channel of said video recorder.

5. A construction and civil engineering database generator according to claim 1, the generator being mounted on a platform that is freely movable within the interior of a cylindrical structure including pipelines, aqueducts and tunnels, wherein said image input unit is arranged to successively capture images of the interior of said cylindrical structure following the movement of the image input unit, said position measuring unit uses acoustic waves or ultrasonic waves, and the database generator further comprises a frame memory to store the digital positional information output as digital data.

6. A construction and civil engineering database generator according to claim 5, wherein said position measuring unit comprises a transmitter for transmitting ultrasonic pulses and a receiver for receiving the reflected waves, and said video recorder records the output from said receiver as said positional information.

7. A construction and civil engineering database generator according to claim 5, wherein said position measuring unit comprises a vibrator for vibrating said cylindrical structure and a detector for detecting said vibration, and said video recorder records the output from said detector as said positional information.

8. A construction and civil engineering database generator according to claim 1, wherein, when images of said object are captured and synthesized at different times, said memory stores a plurality of synthesized image data for each of said times.

9. A construction and civil engineering database generator according to claim 1, wherein the images stored in said memory comprise three-dimensional positional information relating to the displayed portion, and link information relating to said portion.

10. A device for displaying the image of the long and narrow object obtained from a construction and civil engineering database generator which synthesizes a plurality of successive images of a long and narrow construction or civil engineering object to generate the data for said object in its whole size, the data base generator comprising:

an image input unit which moves in the direction of the length of said object to successively capture images of said object;

a position measuring unit which outputs data relating to the capturing position;

a video recorder which records the output from said image input unit in synchronism with the positional information output from said position measuring unit;

an image synthesis unit which, when the information recorded by said video recorder is reproduced, refers to said positional information and synthesizes the reproduced plurality of images into one image; and a memory for storing the synthesized image, and the display device comprising:

a main screen display unit which displays the main image showing a portion of said object; and a sub-screen display unit which displays the sub-image indicating which part of said object said main screen is displaying.

11. A construction and civil engineering database display according to claim 10, comprising a link display unit displaying link information contained in said image.

12. A construction and civil engineering database display according to claim 11, wherein said link information relates to the three-dimensional positional information of said image and includes at least one of comment information, estimate information, solution method information, and related internet address information.

13. A construction and civil engineering database display according to claim 10, comprising a comparator which compares plurality of images stored in said memory and outputs information relating to the portion to which changes have occurred.

14. A construction and civil engineering database display according to claim 10, comprising an image data updating section which updates corresponding portions of images stored in said memory based on newly obtained image portions of said object.

15. A construction and civil engineering database display according to claim 10, wherein the construction and civil engineering database is built on an Internet server, and said main screen display unit and said sub-screen display unit are realized through an Internet browser.

* * * * *